US010654698B2

(12) United States Patent
Zuccotti (10) Patent No.: US 10,654,698 B2
(45) Date of Patent: May 19, 2020

(54) UNIT FOR THE APPLICATION OF LIDS OF OPENING DEVICES

(71) Applicant: TETRA LAVAL HOLDINGS & FINANCE S.A., Pully (CH)

(72) Inventor: Alessandro Zuccotti, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 675 days.

(21) Appl. No.: 15/301,877

(22) PCT Filed: Feb. 19, 2015

(86) PCT No.: PCT/EP2015/053469
§ 371 (c)(1),
(2) Date: Oct. 4, 2016

(87) PCT Pub. No.: WO2015/149988
PCT Pub. Date: Oct. 8, 2015

(65) Prior Publication Data
US 2017/0029257 A1 Feb. 2, 2017

(30) Foreign Application Priority Data
Apr. 4, 2014 (EP) .................................... 14163507

(51) Int. Cl.
*B67B 3/26* (2006.01)
*B67B 3/20* (2006.01)
(Continued)

(52) U.S. Cl.
CPC .......... *B67B 3/2053* (2013.01); *B65B 7/2835* (2013.01); *B67B 3/2066* (2013.01);
(Continued)

(58) Field of Classification Search
CPC ... B67B 3/2053; B67B 3/2086; B67B 3/2066; B67B 3/26; B65B 7/2835; B65B 7/28; B65B 7/2807; H02K 41/031
(Continued)

(56) References Cited

U.S. PATENT DOCUMENTS 3,852,941 A 12/1974 Bross
5,809,742 A * 9/1998 Takakusaki ............. B65B 55/24
53/317
(Continued)

FOREIGN PATENT DOCUMENTS

DE 10 2011 10842 A1 1/2013
EP 1 813 418 A1 8/2007
(Continued)

OTHER PUBLICATIONS

International Search Report (PCT/ISA/210) dated Apr. 1, 2015, by the European Patent Office as the International Searching Authority for International Application No. PCT/EP2015/053469.
(Continued)

*Primary Examiner* — Chelsea E Stinson
*Assistant Examiner* — Mary C Hibbert-Copeland
(74) *Attorney, Agent, or Firm* — Buchanan Ingersoll & Rooney PC (57) ABSTRACT

An applying unit for applying lids of opening devices to spouts of packages comprises a plurality of applying devices arranged for applying the lids to the spouts, a plurality of transfer arrangements, each transfer arrangement supporting a corresponding applying device and being movable along a track arrangement, wherein the transfer arrangements are self-movable along the track arrangement and are movable independently from each other along the track arrangement.

20 Claims, 5 Drawing Sheets

(51) Int. Cl.
  *H02K 41/03* (2006.01)
  *B65B 7/28* (2006.01)
  *B65B 59/02* (2006.01)
  *B65B 61/18* (2006.01)
  *B65B 57/16* (2006.01)

(52) U.S. Cl.
  CPC ............ *B67B 3/26* (2013.01); *H02K 41/031* (2013.01); *B65B 7/2807* (2013.01); *B65B 57/16* (2013.01); *B65B 59/02* (2013.01); *B65B 61/186* (2013.01)

(58) Field of Classification Search
  USPC ..................................... 53/76, 314, 313, 315
  See application file for complete search history.

(56) References Cited

U.S. PATENT DOCUMENTS

| | | |
|---|---|---|
| 2009/0025337 A1 | 1/2009 | Skarin et al. |
| 2011/0203223 A1 | 8/2011 | Maccagnani et al. |
| 2011/0203225 A1 | 8/2011 | Maccagnani et al. |
| 2012/0204513 A1 | 8/2012 | Skarin et al. |
| 2014/0174029 A1* | 6/2014 | Fahldieck ............. B67B 3/2066 53/331.5 |

FOREIGN PATENT DOCUMENTS

| | | |
|---|---|---|
| EP | 1 813 533 A1 | 8/2007 |
| EP | 2 376 331 A1 | 10/2011 |
| JP | H04-087911 A | 3/1992 |
| JP | 2000-159291 A | 6/2000 |
| WO | WO 2010/055149 A1 | 5/2010 |

OTHER PUBLICATIONS

Written Opinion (PCT/ISA/237) dated Apr. 1, 2015, by the European Patent Office as the International Searching Authority for International Application No. PCT/EP2015/053469.

Office Action (Notification of Reasons for Refusal) dated Apr. 27, 2018, by the Japanese Patent Office in corresponding Japanese Patent Application No. 2016-560775, and an English Translation of the Office Action. (7 pages).

* cited by examiner

UNIT FOR THE APPLICATION OF LIDS OF OPENING DEVICES

TECHNICAL FIELD

The present invention relates to a unit for the application of lids of opening devices, in particular opening devices for sealed packages of food products.

BACKGROUND OF INVENTION

As is known, many pourable food products, such as fruit juice, UHT (ultra-high-temperature treated) milk, wine, tomato sauce, etc., are commercially available in sealed packages made of a packaging material that has previously been sterilised.

A typical example of this type of package is the parallelepiped-shaped package for liquid or pourable food products known as Tetra Brik Aseptic (registered trademark), which is made by folding and sealing laminated strip packaging material.

The packaging material has a multi-layer structure substantially comprising a base layer for stiffness and strength, which may comprise a layer of fibrous material, e.g. paper, or of mineral-filled polypropylene material, and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution. Once sterilization is completed, the sterilization agent is removed from the surfaces of the packaging material, e.g. evaporated by heating. The web of packaging material sterilized in this manner is maintained in a closed, sterile environment, and is folded and sealed longitudinally to form a vertical tube.

The tube is filled with the sterilized or sterile-processed food product, and is sealed at equally spaced cross sections, along which it is eventually cut to form the packs. These pillow-shaped packs are then folded mechanically to form finished, e.g. substantially parallelepiped-shaped, packages.

Alternatively, the packaging material may be cut into blanks, which are formed into packages on forming spindles. These packages are filled with the food product and sealed. One example of this type of package is the so-called "gable-top" package known by the trade name Tetra Rex (registered trademark).

According to a possible manufacturing process a spout is injection moulded directly onto the packaging material when the packaging material has the shape of a web, or a sheet, i.e. before the packaging material is formed, filled and sealed so as to obtain the final packages.

In this case, the spout comprises a flange attached to the packaging material, a neck—for example a threaded neck—protruding from the packaging material and defining a pouring opening, and a wall closing the pouring opening and removable from the neck through a pull element that may be pulled by a user when the package is opened for the first time.

As disclosed above, the formed, filled and sealed packages come out from the filling machine with their necks extending from a top wall of the packages.

Downstream of the filling machine there is provided an applying unit for applying lids to the necks of the packages.

The applying unit comprises a conveyor along which the packages are advanced, a distribution unit that releases a lid to a respective neck, whilst the package is advanced by the conveyor, and a capping unit that screws the lid onto the neck. The capping unit comprises a couple of belts. Each belt has an active branch that is substantially parallel to the active branch of the other belt. The active branches move along opposite directions and interact with diametrically opposite portions of the lid, so as to rotate the lid and screw the lid onto the neck.

A drawback of the known applying units is that they are not very precise. The belts, in fact, may be worn so affecting the positioning of the lids and the screwing torque.

The known applying units apply the lids owing to the friction between the belts and the lids. The performances of the known applying unit, therefore, depend on the settings and on the adjustments and fine tuning carried out by the operator. The known applying units, therefore, may be not very reliable, especially when the output rate is high.

In addition, the known applying units are not very flexible. In other words, major re-arrangements are required in case the size and shape of the packages on which the lids have to be applied is changed.

Moreover, since the belts interact with diametrically opposite portions of the lid, the known applying units are only suitable for applying round, or substantially round, lids.

DISCLOSURE OF INVENTION

An object of the invention is to improve the applying units for applying lids of opening devices to packages.

A further object of the invention is to enhance the flexibility of the applying units for applying lids of opening devices to packages.

A further object of the invention is to provide an applying unit that can apply lids to packages having different shapes and sizes without the need of major re-configuration of the applying unit.

A further object of the invention is to provide an applying unit that can apply lids of different sizes and shapes (in particular non-rounded lids) to packages.

A further object of the invention is to provide an applying unit that can apply lids to packages at a very high output rate (for example more than 40000 packages/hour).

According to the invention there is provided an applying unit for applying lids of opening devices to packages according to claim 1.

BRIEF DESCRIPTION OF THE DRAWINGS

A preferred embodiment is hereinafter disclosed for a better understanding of the present invention, by way of non-limitative example and with reference to the accompanying drawings, in which.

DETAILED DESCRIPTION OF PREFERRED EMBODIMENTS

FIGS. 1 to 5 show an applying unit 1 for applying lids 100 of opening devices 2 on packages 3, in particular packages 3 of food products pourable into a tube of packaging material.

In one embodiment, the packages 3 are produced upstream of the applying unit 1 by a packaging machine from a sheet packaging material comprising a base layer, e.g. formed by cardboard-like fibrous material or mineral-filled polypropylene material, and a number of layers of heat-seal plastic material, e.g. polyethylene film, covering both sides of the base layer, when the packages 3 are intended for aseptic packaging of long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the packages 3 eventually contacting the food product.

Preferably, the packaging machine manufactures sealed packages 3 containing a pourable food product, such as UHT or pasteurised milk, fruit juice, wine, etc.

The packaging machine could also manufacture sealed packages 3 containing a food product, which may be poured within the tube of packaging material during the step of manufacturing the packages 3 and subsequently hardens upon sealing of the packages 3. An example of the latter food product is a portion of cheese, which is melted during the step of manufacturing the packages 3 and subsequently hardens upon sealing of the packages 3.

In one embodiment, each opening device 2 comprises a spout 4 that is moulded, in particular injection moulded, directly onto the packaging material when the packaging material has the shape of a web, or a sheet, i.e. before the packaging material is formed, filled and sealed so as to obtain the final packages 3.

In this case, the spout 4 comprises a flange attached to the packaging material, a neck—particularly a threaded neck— protruding from a top wall of the packages 3 and defining a pouring opening, and a wall portion closing the pouring opening. The wall portion is removed from the neck through a pull element that may be pulled by a user when the packages 3 are opened for the first time.

The opening device 2 may be moulded on the packaging material at a hole, punched in the packaging material in the filling machine.

Alternatively, the opening device 2 may be moulded on the packaging material at a so-called "prelaminated" hole, i.e. a hole formed in the base layer of the packaging material and closed hermetically by other layers (at least the layers of thermoplastic material) of the packaging material.

Each package 3 has, in the embodiment shown, a substantially parallelepiped body 5 and a slanted top wall 6, i.e. a top wall that is inclined with respect to a base wall 7 of the package 3. In other words, when the bottom wall 7 of the package 3 rests on a horizontal surface, the top wall 6 is inclined with respect to a horizontal plane parallel to the bottom wall 7.

In another embodiment, not shown, each package has a substantially parallelepiped body 5 and a top wall substantially parallel to the bottom wall.

In general, the applying unit 1 may work with packages of different shapes.

The applying unit 1 further comprises a conveying device 8 for conveying the packages 3 along a path Q. Path Q is rectilinear in the embodiment shown.

The applying unit 1 also comprises a sequencing mechanism 18 interacting with the packages 3 travelling along path Q.

The applying unit 1 further comprises a sensor 17 for generating a signal associated to the position of the packages 3, in particular the position of the spout 4 on which a corresponding lid 100 has to be applied.

The conveying device 8 comprises a linear conveyor 9 that extends along path Q and cooperates with the bottom walls 7 of the packages 3. In particular, the linear conveyor comprises belt a 10 having an active branch, arranged in a substantially horizontal plane, which supports and advances the packages 3.

The conveying device 8 further comprises a pair of endless belt conveyors 22 positioned on opposite lateral sides of the linear conveyor 9 and arranged to interact with respective opposite side walls 11 of the packages 3 that are carried by the linear conveyor 9.

The applying unit 1 further comprises a capping device 12. The capping device 12 is arranged above the conveying device 8 and is intended to apply the lids 100 to the spouts 4, whilst the packages 3 are advanced by the conveying device 8.

The capping device 12 comprises a plurality of applying devices 40 that move along path Q and apply the lids 100 to the spouts 4 of the opening devices 2.

The capping device 12 further comprises a track arrangement 20 and a plurality of transfer arrangements 19 movable on the track arrangement 20, each transfer arrangement 19 being operatively connected to a corresponding applying device 40.

The capping device 12 also comprises a control unit 21 which controls the transfer arrangements 19 on the basis of the signal generated by the sensor 17.

The track arrangement 20 comprises a first track 23a and a second tack 23b. Alternatively, the track arrangement 20 may comprise only one track, or more than two tracks.

Each transfer arrangement 19 comprises a first cart 25a a movable along the first track 23a and a second cart 25b movable along the second track 23b. Alternatively, each transfer arrangement 19 may comprise only one cart, or more than two carts, depending on the number of tracks of the corresponding track arrangement.

The track arrangement 20 is substantially rectilinear and parallel to path Q.

The transfer arrangements 19 are self-movable and move relative to the track arrangement 20 independently of each other.

More specifically, the track arrangement 20 houses a stator armature 24 formed by a plurality of individually-excitable solenoids (known per se), and the transfer arrangements 19 house respective permanent magnets (known per se) independently movable along the track arrangement 20 by individually controlling the solenoids by means of the control unit 21.

In another embodiment the individually-excitable solenoids are carried by the transfer arrangements and the permanent magnets are housed by the track arrangement.

The capping device 12 further comprises a guide device 26 for guiding the transfer arrangements 19 along the track arrangement 20.

The guide device 26 comprises a bar arrangement 27 and a plurality of slide arrangements 28 movable on the bar arrangement 27, each slide arrangement 28 being operatively connected to a corresponding applying device 40.

The bar arrangement 27 comprises a first bar 29a and a second bar 29b. Alternatively, the bar arrangement 27 may comprise only one bar, or more than two bar.

Each slide arrangement 28 comprises a first slide 30a movable along the first bar 29a and a second slide 30b movable along the second bar 29b. Alternatively, each slide arrangement 28 may comprise only one slide, or more than two slides, depending on the number of bars of the corresponding bar arrangement.

The bar arrangement 27 is substantially rectilinear and parallel to path Q.

The capping device 12 further comprises a delivery assembly 13 for feeding the lids 100 to the opening devices 2. The delivery assembly comprises a slide 14 and a feeding unit—not shown—that supplies the lids 100 to the slide 14. The slide 14 is inclined with respect to the linear conveyor 9, in particular with respect to the belt 10, in such a way that the distance between the slide 14 and the linear conveyor 9 decreases when moving along path Q. The slide 14 comprises, at an end 15 thereof closer to the linear conveyor 9, a dispensing opening 16. The dispensing opening is configured so as to loosely retain one lid 100. In particular, the lid 100 partially projects from the dispensing opening 16, but—at the same time—is prevented from falling down from the dispensing opening 16.

In this way, when the package 3—advanced along the linear conveyor 9—reaches the slide 14, the spout 4 of the opening device 2 interacts with the lid 100 retained by the dispensing opening 16 and removes the lid 100 from the dispensing opening 16. Therefore, downstream of the slide 14, the lid 100 rests on the spout 4, but it is not fully applied to the spout 4.

Each transfer arrangement 19 comprises a supporting structure 31 connected to the first slide 30a and second slide 30b and to the first cart 25a and second cart 25b.

The supporting structure 31 supports a corresponding applying device 40.

Each applying device 40 comprises an applying head 41 movable with respect to the supporting structure 31 along an axis A, substantially perpendicular to path Q. In the embodiment shown, axis A is substantially vertical. The applying head 41 is also rotatable with respect to the supporting structure 31 around axis A, according to direction R.

In operation, the applying head 40 moves along axis A and rotates around axis A, according to direction R, so as to screw the lids 100 on the spouts 4.

The sequencing mechanism 18 interacts with the packages 3, so as to:
either forming a queue of packages 3 substantially with no gap therebetween, in particular if a length l of the packages 3 measured along path Q is greater than the minimum pitch between two consecutive applying devices 40; or
forming a queue of packages 3 spaced by a gap along path Q, in particular if the length l of the packages 3 is smaller than the minimum pitch between two consecutive applying devices 40.

The sequencing mechanism 18 comprises a motor—not shown—and a couple belts 32 driven by the motor, arranged on opposite sides of the linear conveyor 9 and adapted to exert a given grip on the side walls 11 of the packages 3.

The operation of the applying unit 1 is described in the following of the present description with reference to one package 3, to the corresponding lid 100 and to the associated applying device 40.

The package 3 is advanced along the conveying device 9 and, upon reaching the delivery assembly 13, the spout 4 removes a lid 100 from the dispensing opening 16.

Downstream of the delivery assembly 13 the lid 100 abuts on the spout 4.

The sensor 17 generates a signal associated to the position of the package 3, and therefore of the lid 100.

On the basis of that signal, the control unit 20 controls the transfer arrangement 19 so as to move the applying device 40 along a direction D, parallel to the advancing direction of the packages 3 along path Q.

The applying device 40 moves, along direction D, together with the package 3, and the applying head 41 is translated along axis A and rotated around axis A so as to screw the lid 100 on the spout 4, whilst the package 3 is moved along the linear conveyor 9. In other words, the transfer arrangement 19 is synchronized with the package 3 and, therefore, the applying device 40 follows the package 3 along path Q.

Once the lid 100 has been applied to the spout 4, the transfer arrangement 19 (and therefore the applying device 40) is moved along a further direction E, opposite to direction D, with respect to the advancing direction of the packages 3 along path Q.

The applying device 40 is so aligned—and subsequently interacts—with a new package 3, to apply a lid 100 to the spout of the new package 3.

The transfer arrangement 19 (and the applying device 40) has, therefore, an indexing movement, i.e. reciprocates, along path Q.

In the embodiment shown the capping device 12 comprises six applying devices 40. In this way, six lids 100 are applied to six packages 3 substantially at the same time.

Despite the fact that the length l is smaller than the minimum pitch between two consecutive applying devices 40, the sequencing mechanism 18 interacts with the packages 3 so as to form a queue of packages 3 substantially with no gap therebetween.

Figure 1:
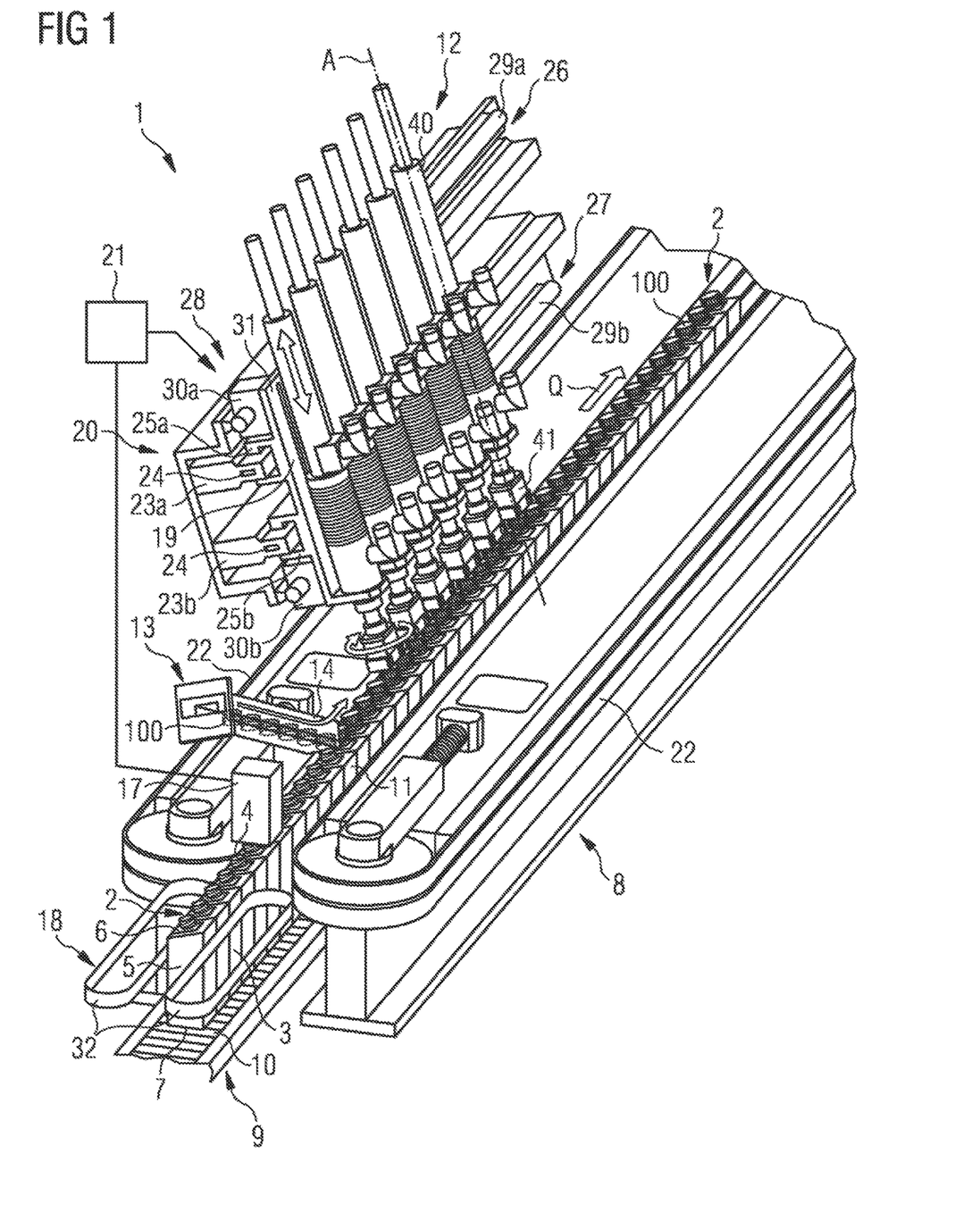
FIG. 1 is a perspective view of an applying unit according to the present invention, with parts removed for the sake of clarity.
Figure 2:
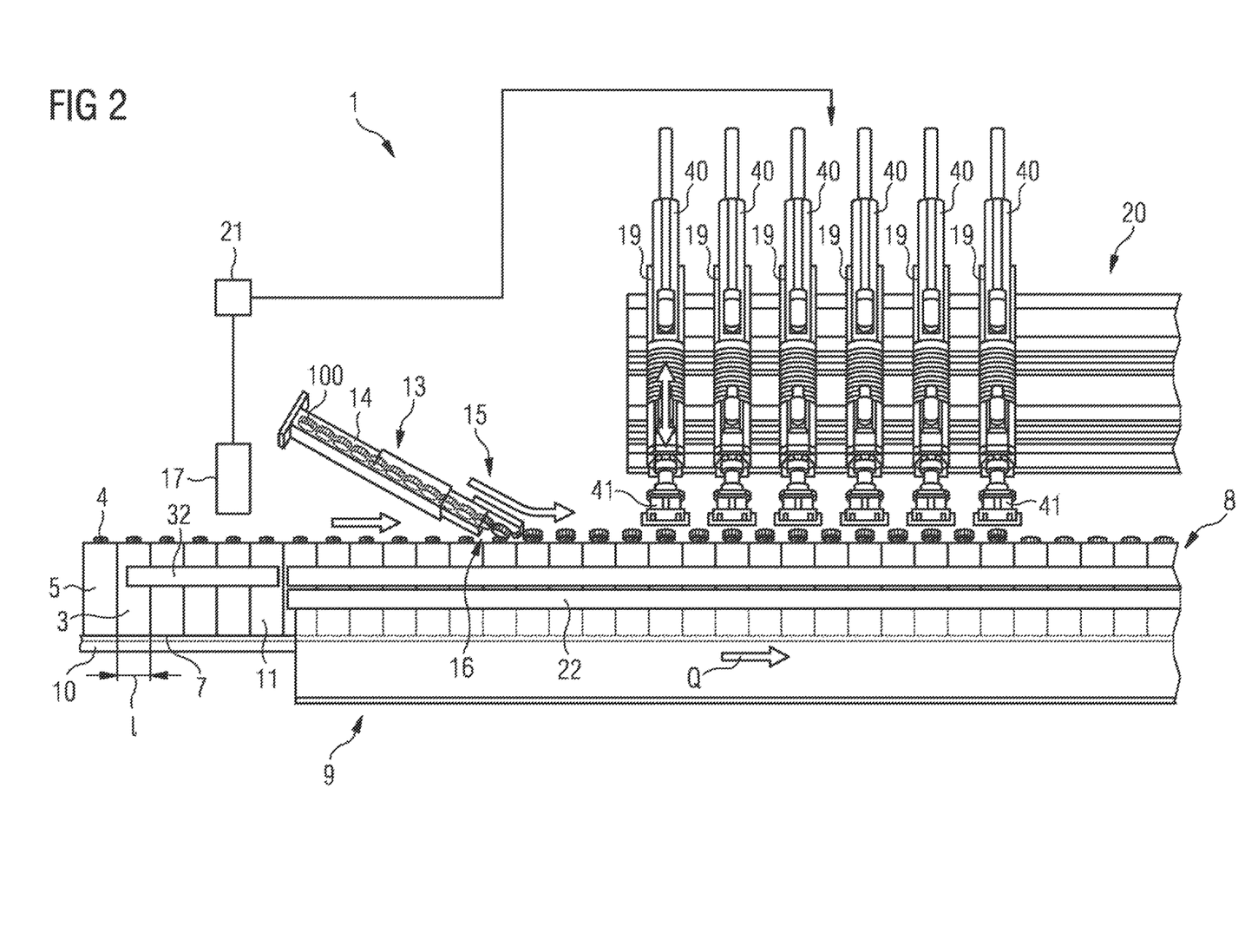
FIGS. 2 to 5 are side views of the applying unit of FIG. 1, which show subsequent steps of an operating cycle of the applying unit.
Figure 3:
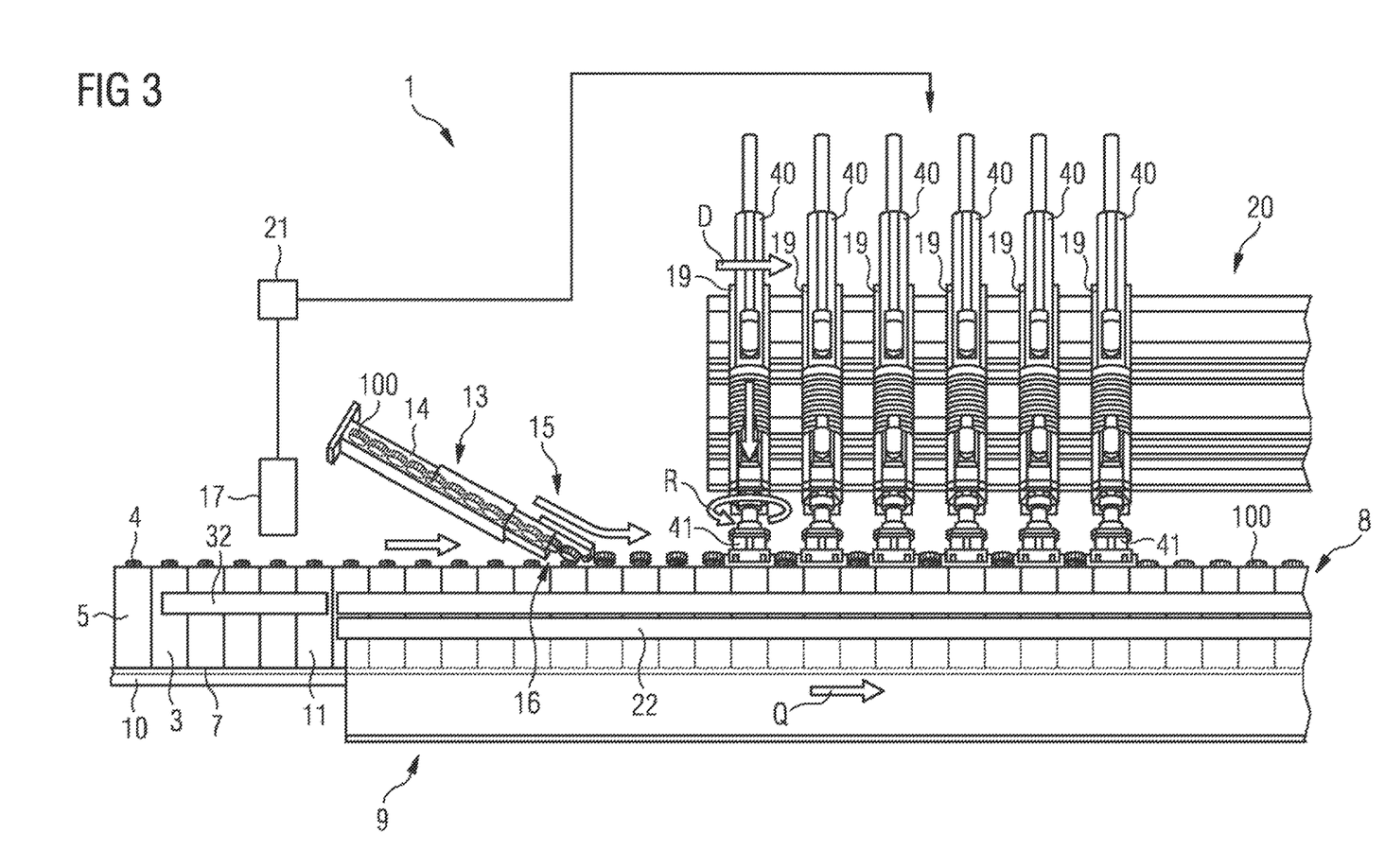
Figure 4:
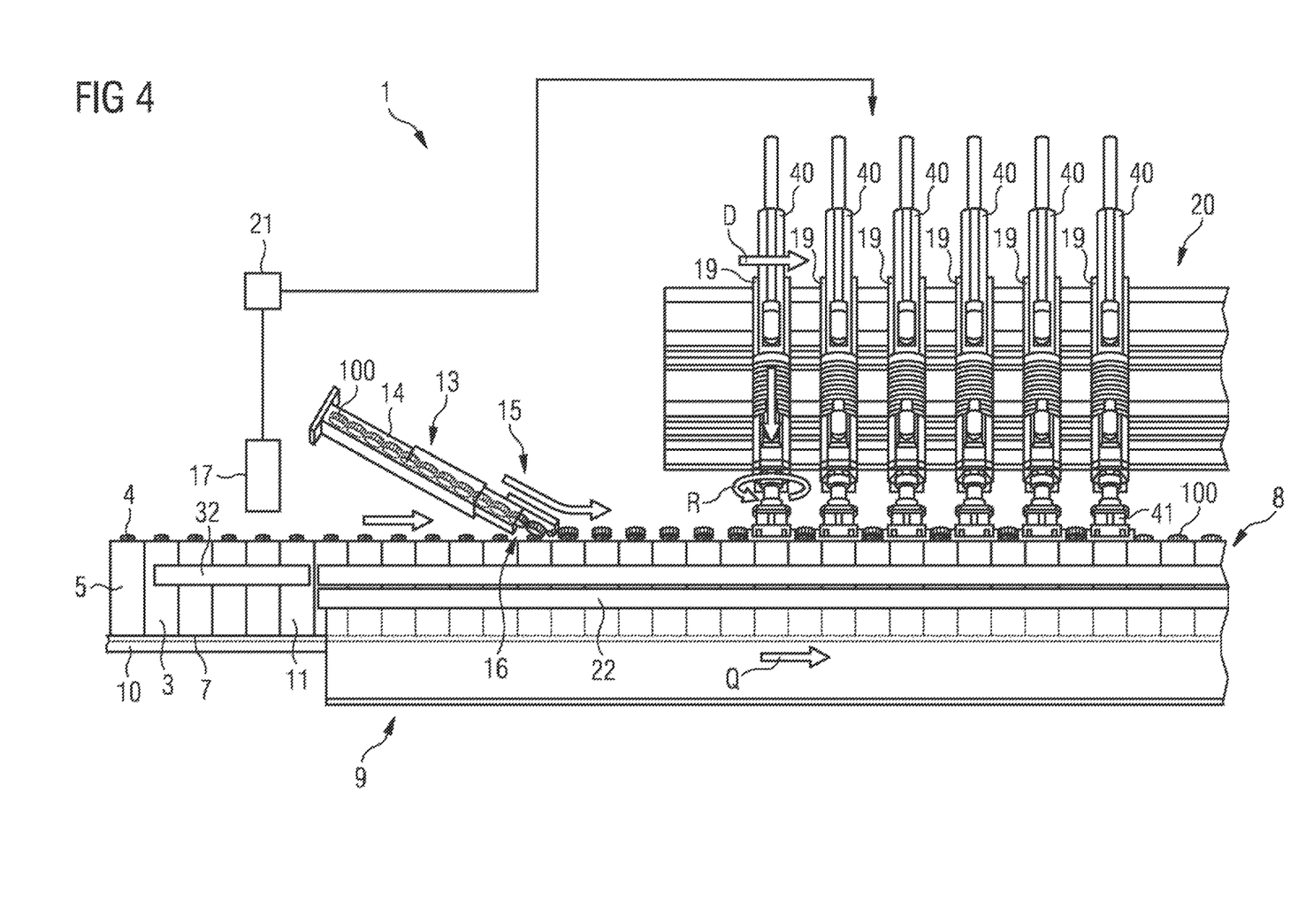

The capping device 12, therefore, interacts with a group of twelve packages 3 in two consecutive steps. During the first step (as shown in FIGS. 2 to 4), the six applying devices 40 apply six lids 100 to six packages 3, in particular on the first, third, fifth, seventh, ninth and eleventh package 3 of the group of packages 3.

This happens whilst the packages 3 move along path Q in the advancing direction.

Figure 5:
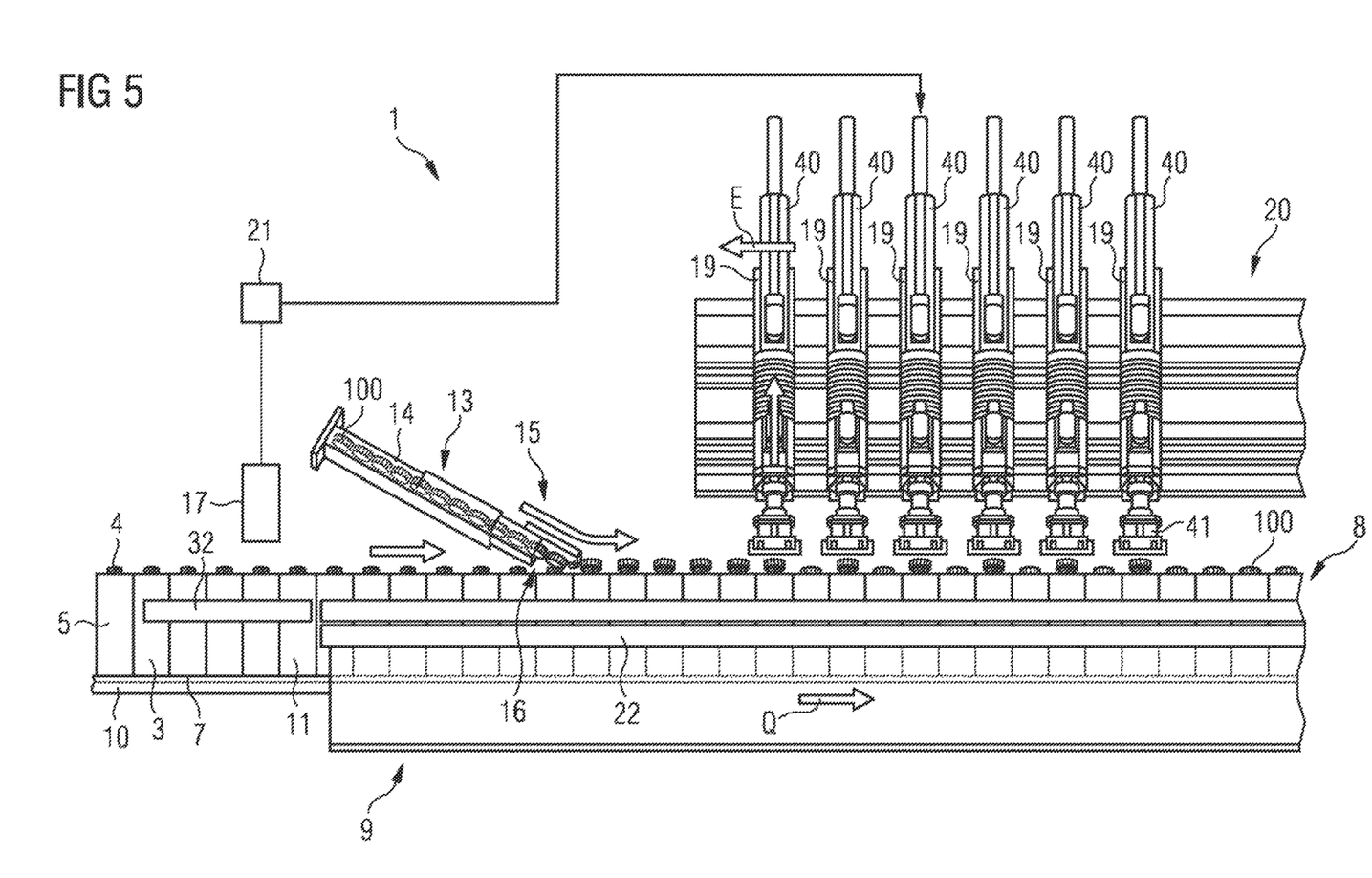

During the second step (as shown in FIG. 5), the six applying devices 40 are moved along the further direction E and are aligned with the remaining six packages 3 of the group and apply the lids 100 on such packages 3, in particular on the second, fourth, sixth, eighth, tenth and twelfth package 3 of the group of packages 3.

This happens whilst the packages 3 move along path Q in the advancing direction.

Subsequently the the six applying devices 40 are moved along the further direction E and interact with a new group of packages 3.

In another embodiment, not shown, the six applying devices 40 interacts with a group of six consecutive packages 3 and apply the lids 100 to the packages 3 whilst the packages 3 move along path Q in the advancing direction. Subsequently the six applying devices 40 are moved along the further direction E and interact with a new group of six consecutive packages 3. This happens, in particular, with a queue of packages 3 substantially with no gap therebetween—if the length l of the packages 3 measured along path Q is greater than the minimum pitch between two consecutive applying devices 40—or with a queue of packages 3 spaced by a gap along path Q.

In another embodiment, not shown, the track arrangement 20 is shaped as a loop. The track arrangement 20 is arranged above the conveying device 8 and in a plane parallel to path Q. In particular, the track arrangement 20 is arranged in a substantially vertical plane.

The track arrangement 20 comprises a rectilinear active branch, a rectilinear return branch, a first curved branch and a second curved branch connecting opposite ends of the active branch and the return branch. The active branch is closer to the conveying device 8 than the return branch. In particular the return branch is arranged above the active branch.

During operation the applying devices 40 apply the lids 100 to a group of packages 3 whilst the corresponding transfer arrangements 19 move along the active branch. Subsequently the transfer arrangement 19 are moved along the first curved branch, the return branch and the second curved branch so as to reach again the active branch and apply the lids 100 to a another group of packages 3.

The speed of the transfer arrangements 19 along the active branch is the sane as the speed of the packages (at least when the applying devices 40 apply the lids 100 to the packages 3). The speed of the transfer arrangements 19 along the first curved branch, the return branch and the second curved branch may be different—and, in particular, greater—than the speed of the transfer arrangements 19 along the active branch.

In another embodiment, not shown, the opening devices 2 comprise flip caps, rather than screw caps.

In this case, the applying devices 40 are configured to push the lids 100 on the spout 4, instead of screwing the lids 100 as in the embodiment shown.

In general, the applying devices 40 may be equipped with different kinds of applying heads 41, suck different kinds of applying heads 41 being able to apply different kinds of lids 100.

From an analysis of the features of the applying unit 1, the advantages it allows to obtain are apparent.

In particular, the transfer arrangements 19 are self-movable and movable independently from each other along the track arrangement 20.

Accordingly, each transfer arrangement 19 may move along the track arrangement 20 with a specific motion law.

In this way, it is possible to process lids 100 of different shapes and sizes—and packages of different shapes and sizes—by simply changing the motion law the transfer arrangements 19 and without substantially re-configuring the applying unit 1. The flexibility of the applying unit 1 is therefore highly enhanced with respect to the known applying units.

In addition, owing to the invention it is possible to apply non-round lids, since the lids are applied by the applying heads 41 and not by belts which have to interact whit diametrically opposite portions of the lids in order to rotate the lids.

Furthermore, there is no need of synchronizing the packages 3 with the applying device 40 upstream of the track arrangement 20, since each transfer arrangement 19 is controlled independently from the other transfer arrangements 19 by the control unit 21 on the basis of the signal generated by the control unit 21. In fact, the control unit 21 controls the motion law of the transfer arrangements 19 in such a way that each applying device 40 is synchronized with the corresponding package 3.

In view of the above advantages, it has been found that the throughput of the applying unit 1 may be much greater than the one of the known applying units (in particular greater than 40000 packages/hour).

Clearly, changes may be made to the applying units 1 as described and illustrated herein without, however, departing from the scope as defined in the accompanying claims.

The invention claimed is:

1. An applying unit for applying lids of opening devices to spouts of packages, the packages being movable along a conveying direction, the applying unit comprising:
   a track;
   a plurality of applying devices arranged adjacent one another, each applying device including an applying head configured to engage and apply a respective one of the lids to a respective one of the spouts moving along the conveying direction;
   a plurality of carts each movably mounted on the track so that the plurality of carts move along the same track in a direction parallel to the conveying direction, each of the carts being operatively connected to one of the applying devices so that the cart and the respective applying device move together along the track;
   a plurality of individually excitable solenoids provided on either the carts or the track, and a plurality of permanent magnets provided on either the track or the carts; and
   a control unit operatively connected to the individually excitable solenoids to individually operate the solenoids and cause the carts as well as the respective applying device to move along the track parallel to the conveying direction in which the packages are moved independent of movement of other carts along the track.

2. An applying unit according to claim 1, further comprising a sensor configured to issue a signal indicating a position of the spouts, the control unit receiving the signals from the sensor to control movement of the carts.

3. An applying unit according to claim 1, wherein the individually-excitable solenoids are provided in the track and the magnets are provided in the carts.

4. An applying unit according to claim 1, further comprising a conveyor configured to move the packages in the conveying direction along a path, the conveying direction being parallel to the track.

5. An applying unit according to claim 1, wherein the track is a first track and the carts are first carts, and further comprising a second track and second carts, the second carts each being movably mounted on the second track to move along the second track, each of the second carts being operatively connected to one of the applying devices so that the second cart and the respective applying device move along the second track together.

6. An applying unit according to claim 1, wherein the applying devices are each rotatably mounted for rotation about a respective rotation axis.

7. An applying unit according to claim 1, further comprising a plurality of slides movably mounted on and guided by a bar, each slide being connected to one of the applying devices to guide movement of the applying devices as the slides move along the bar.

8. An applying unit that applies lids of opening devices to spouts of packages, the applying unit comprising:

a conveyor configured to receive the packages and to convey the packages in a conveying direction;

a plurality of applying devices arranged adjacent one another, each applying device including an applying head configured to engage and apply a respective one of the lids to a respective one of the spouts on the packages;

a plurality of carts movably mounted on a common track that is parallel to the conveying direction so that the plurality of carts move along the track in a direction parallel to the conveying direction in which the packages are moving during application of the lids to the respective spouts on the packages, each of the carts being operatively connected to one of the applying devices so that each cart and the respective applying device move together along the track;

each of the carts being movable along the common track independently of the other carts and parallel to the conveying direction in which the packages are moving during application of the lids to the respective spouts on the packages so that the applying devices are also movable independently of the other applying devices;

a plurality of individually excitable solenoids provided on either the carts or the track, and a plurality of permanent magnets provided on either the track or the carts;

a control unit operatively connected to the individually excitable solenoids to individually operate the solenoids and cause the carts as well as the respective applying devices to move along the track independent of movement of other carts and the respective applying devices; and the control unit being configured to move the carts and the respective applying devices along the track while the packages are being conveyed in the conveying direction by the conveyor and while the applying devices are applied the lids to the respective spouts on the packages.

9. An applying unit according to claim 8, further comprising a pair of belt conveyors positioned on opposite sides of the conveyor to engage opposite walls of the packages being conveyed by the conveyor.

10. An applying unit according to claim 8, wherein the plurality of applying devices are arranged linearly adjacent one another.

11. An applying unit for applying lids of opening devices to spouts of packages, the applying unit comprising:

a linearly extending conveyor that receives the packages and advances the packages in a conveying direction along a linear path;

a track that is parallel to the conveying direction;

a plurality of lid applying devices each configured to apply one of the lids to a spout of one of the packages, each of the lid applying devices being supported on and movable together with a respective transfer arrangement; and each of the transfer arrangements being mounted on the track and being self-movable along the track independently from each other in a direction parallel to the conveying direction in which the packages move so that the lid applying devices move in the conveying direction together with the packages at the same time as the lid applying devices apply the lids to the spouts of the packages.

12. An applying unit according to claim 11, further comprising a sensor that generates a signal associated with a position of each spout, and an electronic control unit that receives the signals generated by the sensor and that controls movement of the transfer arrangements.

13. An applying unit according to claim 11, wherein: i) the track houses a plurality of individually-excitable solenoids and the transfer arrangements house magnets independently movable along the track by individually controlling the solenoids; or ii) the track houses magnets and the transfer arrangements house a plurality of individually-excitable solenoids independently movable along the track by individually controlling the solenoids.

14. An applying unit according to claim 11, wherein the track is a linear track and the transfer arrangements reciprocate along the track.

15. An applying unit according to claim 11, wherein the track is a loop-shaped track.

16. An applying unit according to claim 11, wherein each lid applying device is supported on the respective transfer arrangement in a manner allowing the lid applying device to move towards and away from the conveyor.

17. An applying unit according to claim 16, wherein each lid applying device is supported on the respective transfer arrangement in a manner allowing the lid applying device to rotate around a respective axis to rotate the lid onto the spout of the package.

18. An applying unit according to claim 11, wherein the track is a first track, and further comprising a second track, each of the transfer arrangements comprising a first cart mounted on and movable along the first track and a second cart mounted on and movable along the second track.

19. An applying unit according to claim 11, further comprising a guide device that guides the transfer arrangements along the track, the guide device comprising a bar and a plurality of slides movably mounted on the bar, each of the slides being connected to a corresponding one of the transfer arrangements.

20. An applying unit according to claim 19, wherein the bar is a first bar, the guide device comprising a second bar spaced from the first bar, the slide being a first slide, the guide device comprising a second slide movably mounted on the second bar, each of the transfer arrangements being connected to one of the first slides and one of the second slides.

* * * * *